United States Patent [19]

Yamagata

[11] Patent Number: 4,770,516
[45] Date of Patent: Sep. 13, 1988

[54] TELEPHOTO LENS SYSTEM CAPABLE OF CLOSEUP SHOOTING

[75] Inventor: Masakazu Yamagata, Tokyo, Japan

[73] Assignee: Asahi Kogaku Kogyo Kabushiki Kaisha, Tokyo, Japan

[21] Appl. No.: 30,415

[22] Filed: Mar. 27, 1987

[30] Foreign Application Priority Data

Mar. 28, 1986 [JP] Japan .................................. 61-72026

[51] Int. Cl.$^4$ .......................... G02B 9/64; G02B 13/02
[52] U.S. Cl. .................................................... 350/454
[58] Field of Search ........................................ 350/454

[56] References Cited

U.S. PATENT DOCUMENTS 4,508,433  4/1985  Kitagishi et al. ..................... 350/454

Primary Examiner—John K. Corbin
Assistant Examiner—Rebecca D. Gass
Attorney, Agent, or Firm—Sughrue, Mion, Zinn, Macpeak & Seas

[57] ABSTRACT

A telephoto lens system which can focus down to unity magnification comprising two lens groups that are displaced during focusing. The front lens group of positive refractive power has five or six elements, namely, a positive lens, a positive meniscus lens, a negative lens, a lens element with a slightly negative refractive power and a positive lens. The rear lens group of negative refractive power has three elements, namely, a positive, a negative and a positive lens element. Additionally, there are four numerical conditions on focal lengths and radii of curvature.

10 Claims, 14 Drawing Sheets

TELEPHOTO LENS SYSTEM CAPABLE OF CLOSEUP SHOOTING

BACKGROUND OF THE INVENTION

1. Field of the Invention

The present invention relates to a telephoto lens system capable of closeup shooting that features an aperture ratio of about 1:2.8 and a viewing angle of about 24.4° which ensures high performance over the full shooting distance ranging from the imaging of an infinitely distant object to a life-size shot.

2. Background of the Invention

Micro or macro lenses have been chiefly used for shooting objects at a near distance. Since most of these lenses are designed to provide best focusing in near-distance shooting, they are not capable of achieving as good aberrational correction when shooting an object at infinity as normal imaging lenses. In response to this situation, a certain type of lens has been proposed that employs a floating mechanism which is capable of correcting the aberrational changes that occur as a result of variation in the shooting distance. Some of the lenses that employ such a floating mechanism have aperture ratios of about 1:2.8 but their focal length is comparatively short (e.g., about 50 mm on a 35 mm camera). In addition, the magnification that can be attained by this lens alone in shooting at the closest focusing distance is approximately 0.5, so that an adapter such as a closeup ring is necessary when shooting the object at a magnification of unity (life size) with this lens. A lens that is capable of near-distance shooting without employing a floating mechanism is also known but because of limitations on its performance this lens can not be made brighter than an aperture ratio of about 1:3.5 to 1:4. In addition, most of the lenses of this type feature magnifications of 0.25–0.5 at the closest focusing distance.

A macro lens that is capable of closeup shooting and which features a focal length of approximately 100 mm in terms of a lens on a 35 mm camera is also known. However, the long focal length of this lens requires a longer lens extension and it is very difficult to produce a system that is capable of shooting at a magnification of unity with this lens alone. Therefore, in order to effect proper focusing when shooting over a very wide range of distances from infinity to a life-size shot, an accessory such as a closeup ring must be used as an aid to permit the lens to be displaced by a distance equal to its focal length.

SUMMARY OF THE INVENTION

The present invention has been accomplished in order to solve the aforementioned problems of the prior art. Accordingly, an object of the invention, is to provide a compact and high-performance lens system that has a telephoto focal length of the order of 100 mm in terms of a lens on a 35 mm camera, which has a relatively bright aperture ratio of about 1:2.8, and which yet has a capability of imaging from an infinite distance to a life-size shot with the lens alone.

The invention can be summarized as a telephoto lens system which can focus down to unity magnification comprising two lens groups that are displaced during focusing. The front lens group of positive refractive power has five or six elements, namely, a positive lens, a positive meniscus lens, a negative lens, a lens element with a slightly negative refractive power and a positive lens. The rear lens group of negative refractive power has three elements, namely, a positive, a negative and a positive lens element. Additionally, there are four numerical conditions on focal lengths and radii of curvature.

DETAILED DESCRIPTION OF THE PREFERRED EMBODIMENTS

Figure 1:
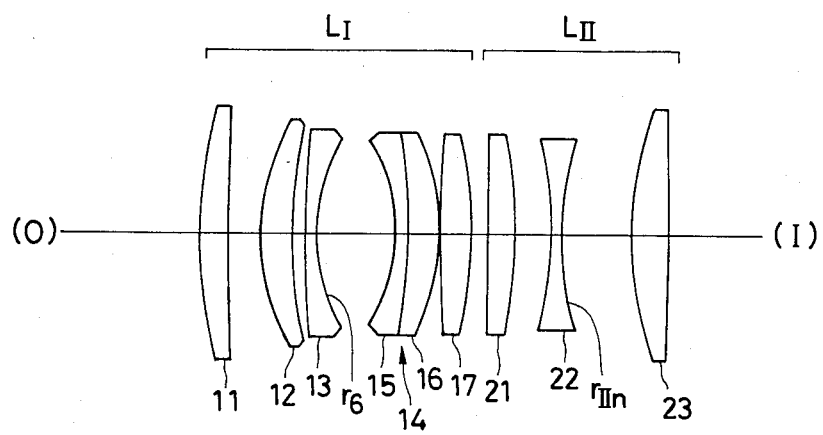
FIGS. 1, 5, 9, 13, 17, 21 and 25 are simplified cross-sectional views of lens systems according to Examples 1 to 7 when they are focused for shooting an object at an infinite distance.
Figure 3:
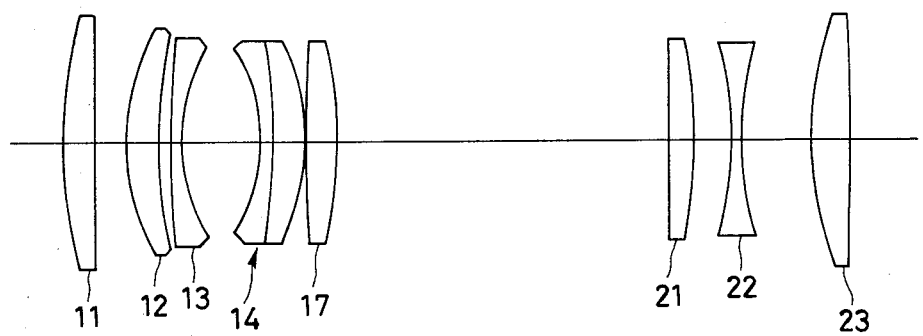
FIGS. 3, 7, 11, 15, 19, 23 and 27 are simplified cross-sectional views of lens systems according to Examples 1 to 7 when they are adjusted for a life-size shot, or imaging at a magnification of unity.
Figure 5:
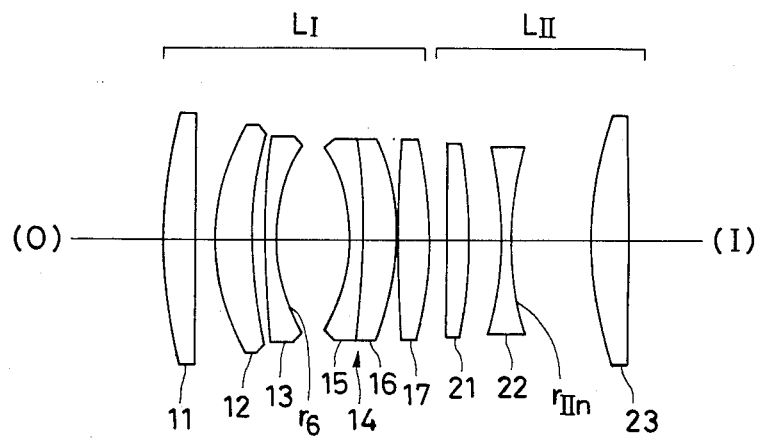
Figure 7:
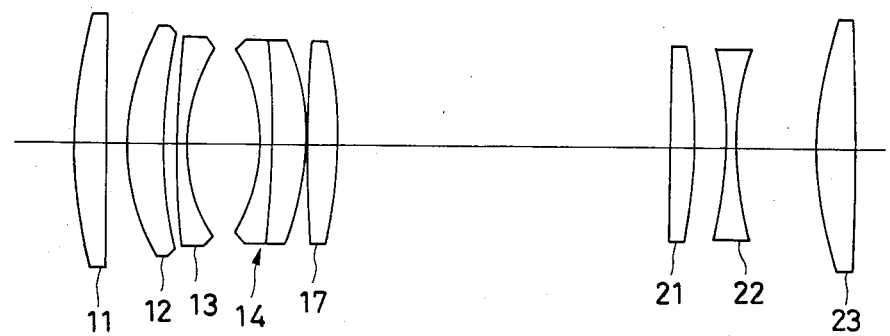
Figure 9:
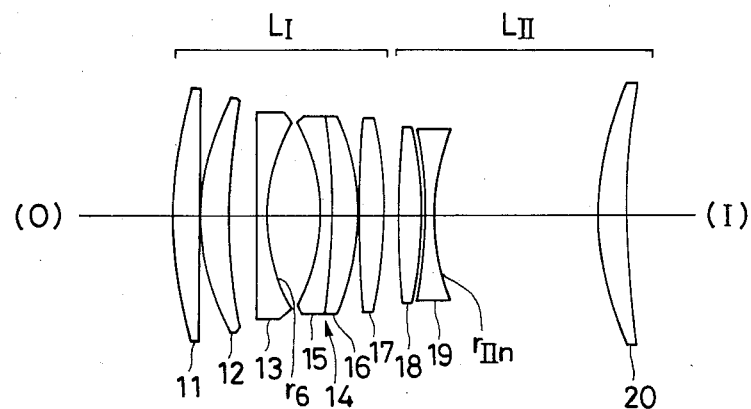
Figure 11:
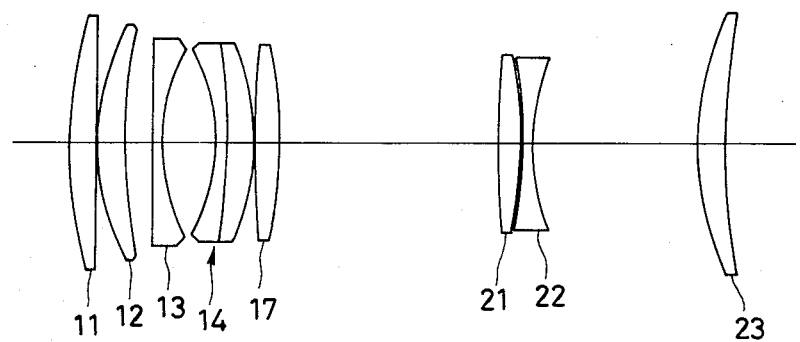
Figure 13:
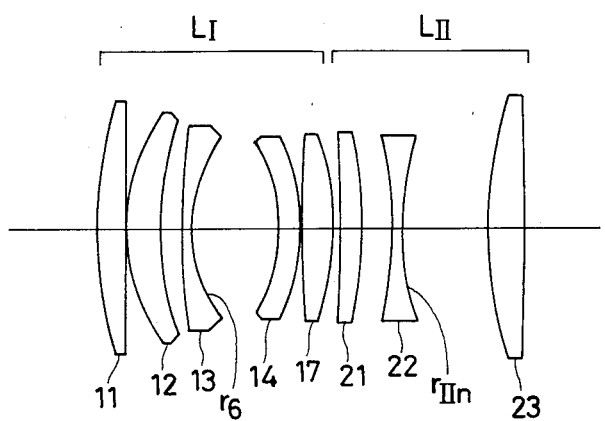
Figure 15:
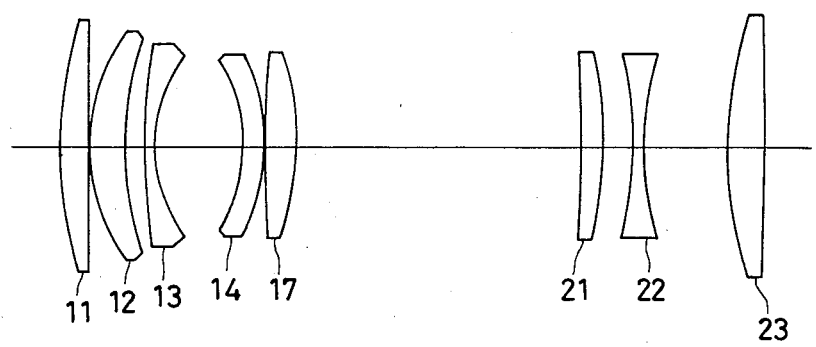
Figure 17:
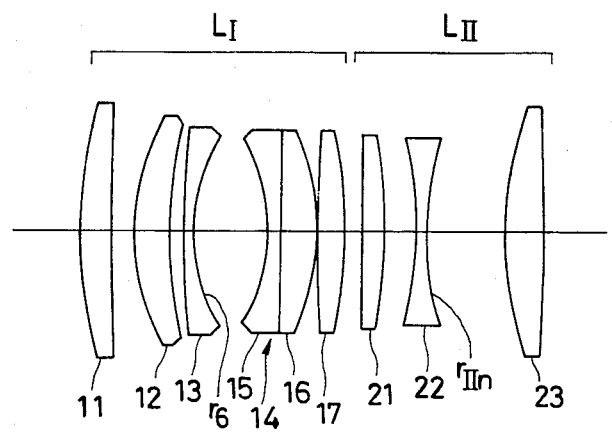
Figure 19:
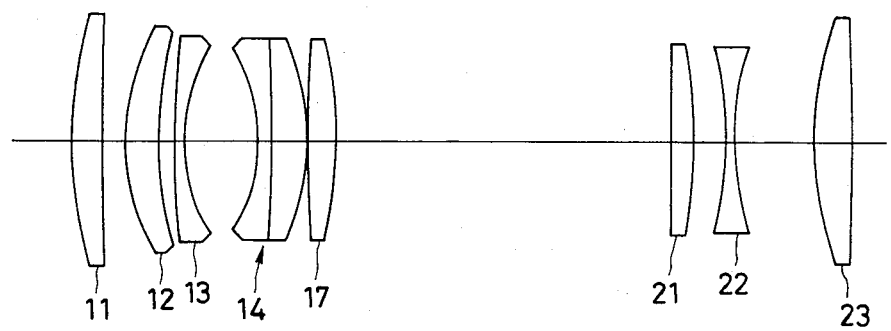
Figure 21:
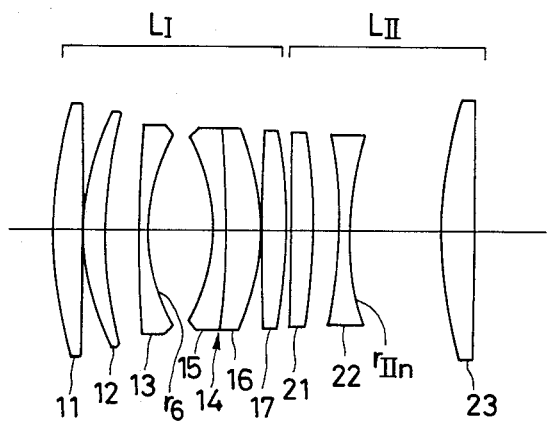
Figure 23:
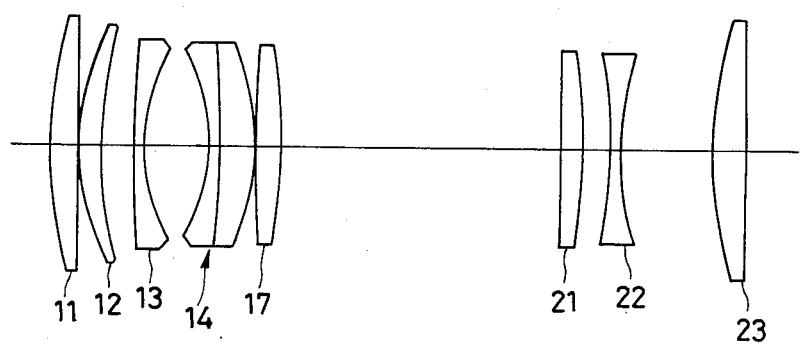
Figure 25:
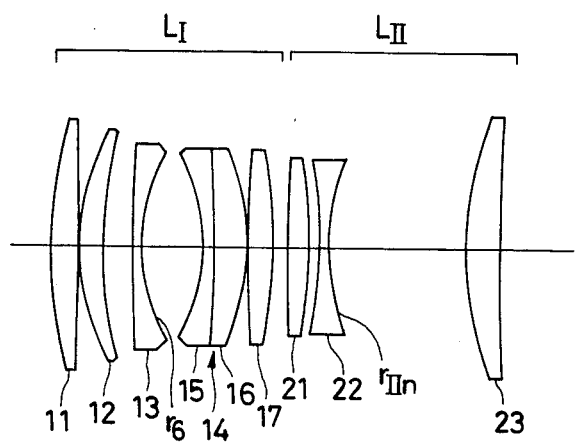
Figure 27:
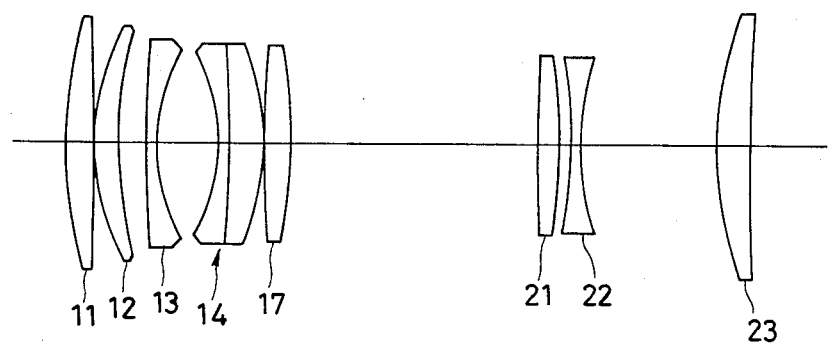

In order to attain the aforementioned object, the present invention provides a lens system that comprises, in order from the object side, a first lens group $L_I$ having a positive refractive power and a second lens group $L_{II}$ having a negative refractive power. Embodiments are illustrated respectively in FIGS. 1, 5, 9, 13, 17, 21 and 25 at infinite focus and in FIGS. 3, 7, 11, 15, 19, 23 and 27 for unity magnification. The lens system effects focusing from an infinite distance to the closest distance by increasing the aerial distance of the first lens group $L_I$ relative to the second lens group $L_{II}$. The lens system of the invention is characterized in that the first lens group $L_I$ has either a five-unit, six-element or five-unit, five-element configuration consisting of a first lens element 11 which is a positive lens, a second lens element 12 which is a positive meniscus lens, a third lens element 13 which is a negative lens, a cemented or a single lens element 14 having a slightly negative value of refractive power (if it is a cemented lens element 14, it is composed of a negative lens 15 and a positive lens 16), and a positive lens element 17. The second lens group $L_{II}$ has a three-unit, three-element configuration consisting of a positive lens element 21, a negative lens element 22 and a positive lens element 23.

The lens system satisfies the following conditions (1) to (4):

$$0.5 < f_I/f < 0.7 \tag{1}$$

$$\tfrac{1}{2} < f_{1,2,3}/f < 1.7 \tag{2}$$

$$-0.4 < f_{r6}/f < -0.2 \tag{3}$$

$$-0.6 < f_{IIn}/f < -0.3. \tag{4}$$

In these equations, $f_{r6} = r_6/(1-n_3)$ and $f_{IIn} = r_{IIn}/(1-n_{IIn})$, wherein $f_I$ is the focal length of the first lens group $L_I$, f is the focal length of the overall system for shooting an infinitely distant object and $f_{1,2,3}$ is the composite focal length of the first, second and third lens elements 11, 12 and 13. The previously defined $f_{r6}$ is the focal length of the surface of the third lens element 13 on the image side where $n_3$ is the refractive index at the d-line of the third lens element 13 and $r_6$ is the radius of curvature of the surface of the third lens element 13 on the image side. Similarly, $f_{IIn}$ is the focal length of the surface on the image side of the negative lens element 23 in the second lens group $L_{II}$ where $n_{IIn}$ is the refractive index at the d-line of the negative lens 23 in the second lens group $L_{II}$ and $r_{IIn}$ is the radius of curvature of the surface on the image side of this negative lens element 23.

According to the lens configuration used in the present invention, the amount of displacement of the first lens group $L_I$ relative to the second lens group $L_{II}$ is reduced to less than half the amount required in the conventional system which achieves focusing by displacing the overall lens system. This small displacement permits the use of a relatively small and lightweight lens barrel for achieving a great improvement in system operability.

If the focal length of the first lens group is written as $f_I$, the focal length of the overall system for shooting an infinitely distant object as f, and the magnification by the overall system as m (m>0), then the amount of displacement of the first lens group, $\Delta D$, can be expressed as $\Delta D = m \cdot f_I^2 / f$.

The four conditions that should be satisfied by the lens system of the present invention are described below.

Condition (1) sets forth the required value for the focal length of the first lens group $L_I$ having a positive refractive power which is positioned on the object side. Such a focal length reduces the amount of displacement of that first lens group $L_I$ to less than half the amount required for achieving proper focusing in the conventional system. If the lower limit of this condition is not reached, the amount of displacement of the first lens group $L_I$ becomes very small but, on the other hand, the negative refractive power of the second lens group $L_{II}$ becomes so strong that the Petzval sum will decrease until it assumes a negative value. Furthermore, compensation of aberrations such as curvature of field and astigmatism becomes too difficult to attain a bright aperture ratio of about 1:2.8 or satisfactory imaging performance. If the upper limit of condition (1) is exceeded, the negative refractive power of the second lens group $L_{II}$ becomes weak to provide for easy compensation of aberrations and an aperture ratio brighter than 1:2.8 but, on the other hand, the amount of displacement of the first lens group $L_I$ rapidly increases to a level that is no smaller than when the overall system is displaced in order to attain proper focusing. In either case, the object of the present invention is not attainable.

The second lens group $L_{II}$ of the lens system of the present invention has a negative refractive power so that in order to ensure that the overall system has an aperture ratio of about 1:2.8, the aperture ratio of the first lens group must be brighter than 1:2.8. Therefore, in the present invention, the first lens group $L_I$ has an aperture ratio within the range of 1:1.95 to 1:1.57 in order to satisfy condition (1). The requirement that should be met to provide the first lens group $L_I$ with an aperture ratio brighter than 1:2.8 is condition (2). This condition (2) sets forth the range of the composite focal length $f_{1,2,3}$ of the first, second and third lens elements 11, 12 and 13 in the first lens group over which aberrational compensation can be achieved with the aperture ratio of the overall system being at about 1:2.8. If the lower limit of condition (2) is not reached, compensation of aberrations such as spherical and coma aberrations becomes too difficult to ensure a bright aperture ratio of about 1:2.8. If, on the other hand, the upper limit of condition (2) is exceeded, the increase in the composite refractive power of the other lens elements in the first lens group is inevitable and it becomes particularly difficult to compensate for spherical aberration. In order to achieve effective compensation of aberrations when the upper limit of condition (2) is exceeded, the upper limit of condition (1) is unavoidably exceeded and the amount of displacement of the first lens group $L_I$ necessary to effect proper focusing is increased to an extent at which the object of the present invention is by no means attainable.

Condition (3) sets forth the required focal length $f_{r6}$ of the surface $r_6$ on the image side of the third lens element 3 in the first lens group $L_I$. A focal length $f_{r6}$ in such a range achieves effective compensation of spherical aberration, astigmatism and coma aberration. If this condition is met, particularly effective compensation of the spherical aberration and astigmatism that occur in shooting at a magnification close to unity can be achieved. If the lower limit of condition (3) is not reached, it becomes difficult to compensate for an excessive amount of spherical aberration, as well as the outward coma that is caused by a downward ray of light and the rear curvature of field that occurs with respect to the best central image plane. If, on the other hand, the upper limit of condition (3) is exceeded, an inward coma is produced by the downward ray of light and the frontal curvature of field that occurs is too great to be effectively compensated. These aberrational variations will progressively increase as the magnification approaches unity. Therefore, if one makes an attempt to effect aberrational compensation outside the range specified by condition (3), he will find that merely displacing the first lens groupe $L_I$ is not sufficient to provide satisfactory imaging performance over the full shooting distance ranging from an infinitely distant object to a life-size shot. As a result, it becomes necessary to employ a floating mechanism for displacing the distance between certain lenses but then this leads to the use of a lens barrel of complicated construction, which is contrary to the purpose of providing a small and lightweight system.

Condition (4) sets forth the required focal length $f_{IIn}$ of the surface $r_{IIn}$ on the image side of the negative lens element 22 in the second lens group $L_{II}$. Such a value for the focal length $f_{IIn}$ achieves effective compensation of astigmatism and provides an appropriate value of the Petzval sum without causing any substantial change in spherical aberration when the shooting distance is varied from infinity to a life-size shot.

There are two cases where the lower limit of condition (4) is not reached. In the first case, that is, if the radius of curvature $r_{IIn}$ of the surface $r_{IIn}$ on the image side of the negative lens element 22 becomes excessive, it becomes difficult to compensate for the rear curvature of field and the Petzval sum becomes too small to provide satisfactory imaging performance on the periphery of the field. In the second case, that is, if the refractive index $n_{IIn}$ of this particular negative lens element 22 becomes unduly small, the Petzval sum which is excessive cannot be reduced to a sufficiently small value to minimize the curvature of field. In addition, astigmatism has a tendency to increase as the magnification approaches unity.

There are also two cases where the upper limit of condition (4) is exceeded. In the first case, that is, if the radius of curvature $r_{IIn}$ of the surface at issue becomes unduly small, it becomes difficult to compensate for the frontal curvature of field. In addition, the astigmatism cannot be reduced and the Petzal sum becomes excessive, to thereby make it difficult to compensate for the astigmatism occurring in the middle portion of the optical field when shooting a distant object. The second case is where the refractive index $n_{IIn}$ of the negative lens element 22 becomes excessively high but this is also undesirable for the purpose of the present invention since the optical material that can be used is limited to one having a dispersion index that is not suitable for achieving achromatism.

Data sheets for seven examples of the present invention are presented below. In these data sheets: f, $F_{NO}$, $\omega$ and $f_B$ denote the focal length, aperture ratio, half viewing angle and the back focus, respectively, of the overall system when it is focused for an object at an infinite distance. In these data sheets r is the radius of curvature of an individual lens surface, d is the thickness or aerial distance of an individual lens element $n_d$ is the refractive index of an individual lens element at the d-line, and $\nu_d$ is the Abbe number of an individual lens element at the d-line. Also, $L_I$ signifies the first lens group and $L_{II}$ denotes the second lens group.

EXAMPLE 1

$f = 100.18 \quad F_{NO} = 1:2.8 \quad 2\omega = 24.4° \quad F_B = 45.51$

| surface | No. | r | d | $n_d$ | $\nu_d$ |
|---|---|---|---|---|---|
| $L_I$ | 1 | 64.764 | 4.300 | 1.78590 | 44.2 |
|  | 2 | 473.491 | 4.773 |  |  |
|  | 3 | 31.180 | 4.800 | 1.80610 | 40.9 |
|  | 4 | 75.635 | 1.800 |  |  |
|  | 5 | 152.788 | 1.500 | 1.80518 | 25.4 |
|  | 6 | 25.817 | 11.674 |  |  |
|  | 7 | −24.386 | 1.800 | 1.74000 | 28.3 |
|  | 8 | −83.740 | 4.500 | 1.80610 | 40.9 |
|  | 9 | −32.411 | 0.150 |  |  |
|  | 10 | 250.715 | 4.602 | 1.72000 | 42.0 |
|  | 11 | −54.589 | 2.500−48.587 |  |  |
| $L_{II}$ | 12 | −906.318 | 3.701 | 1.80518 | 25.4 |
|  | 13 | −67.189 | 5.356 |  |  |
|  | 14 | −51.897 | 1.500 | 1.80610 | 40.9 |
|  | 15 | 47.120 | 10.398 |  |  |
|  | 16 | 50.044 | 5.428 | 1.51633 | 64.1 |
|  | 17 | −466.238 |  |  |  |

EXAMPLE 2

$f = 100.16 \quad F_{NO} = 1:2.8 \quad 2\omega = 24.4° \quad F_B = 46.93$

| surface | No. | r | d | $n_d$ | $\nu_d$ |
|---|---|---|---|---|---|
| $L_I$ | 1 | 64.000 | 4.500 | 1.78590 | 44.2 |
|  | 2 | 750.150 | 3.050 |  |  |
|  | 3 | 31.747 | 5.410 | 1.80610 | 40.9 |
|  | 4 | 66.120 | 1.900 |  |  |
|  | 5 | 128.547 | 1.500 | 1.80518 | 25.4 |
|  | 6 | 26.047 | 10.640 |  |  |
|  | 7 | −25.160 | 1.800 | 1.74000 | 28.3 |
|  | 8 | −120.000 | 5.000 | 1.80610 | 40.9 |
|  | 9 | −34.000 | 0.150 |  |  |
|  | 10 | 244.668 | 4.440 | 1.72000 | 42.0 |
|  | 11 | −57.000 | 2.500−48.587 |  |  |
| $L_{II}$ | 12 | −1351.297 | 3.340 | 1.80518 | 25.4 |
|  | 13 | −68.597 | 4.640 |  |  |
|  | 14 | −55.555 | 1.500 | 1.80610 | 40.9 |
|  | 15 | 46.035 | 11.590 |  |  |
|  | 16 | 51.387 | 5.510 | 1.51633 | 64.1 |
|  | 17 | −370.000 |  |  |  |

EXAMPLE 3

$f = 100.46 \quad F_{NO} = 1:2.8 \quad 2\omega = 24.4° \quad F_B = 40.32$

| surface | No. | r | d | $n_d$ | $\nu_d$ |
|---|---|---|---|---|---|
| $L_I$ | 1 | 61.428 | 4.003 | 1.80400 | 46.6 |
|  | 2 | −828.516 | 0.150 |  |  |
|  | 3 | 34.419 | 4.000 | 1.83481 | 42.7 |
|  | 4 | 84.536 | 4.046 |  |  |
|  | 5 | 1726.841 | 1.500 | 1.78472 | 25.7 |
|  | 6 | 27.243 | 7.784 |  |  |
|  | 7 | −27.071 | 1.800 | 1.72825 | 28.5 |
|  | 8 | −92.450 | 3.632 | 1.83400 | 37.2 |
|  | 9 | −34.908 | 0.150 |  |  |
|  | 10 | 149.627 | 3.777 | 1.77250 | 49.7 |
|  | 11 | −60.691 | 2.000−32.000 |  |  |
| $L_{II}$ | 12 | 124.956 | 3.182 | 1.80518 | 25.4 |
|  | 13 | −65.902 | 0.485 |  |  |
|  | 14 | −66.592 | 1.500 | 1.88300 | 40.8 |
|  | 15 | 34.039 | 23.902 |  |  |
|  | 16 | 42.722 | 3.984 | 1.51633 | 64.1 |
|  | 17 | 106.221 |  |  |  |

EXAMPLE 4

$f = 100.03 \quad F_{NO} = 1:2.8 \quad 2\omega = 24.5° \quad F_B = 42.65$

| surface | No. | r | d | $n_d$ | $\nu_d$ |
|---|---|---|---|---|---|
| $L_I$ | 1 | 58.324 | 4.286 | 1.80400 | 46.6 |
|  | 2 | −3268.671 | 0.126 |  |  |
|  | 3 | 27.176 | 5.044 | 1.80400 | 46.6 |
|  | 4 | 46.785 | 3.038 |  |  |
|  | 5 | 96.990 | 1.500 | 1.80518 | 25.4 |
|  | 6 | 21.790 | 12.883 |  |  |
|  | 7 | −22.910 | 3.000 | 1.80400 | 46.6 |
|  | 8 | −29.198 | 0.200 |  |  |
|  | 9 | 164.912 | 4.609 | 1.61272 | 58.8 |
|  | 10 | −38.915 | 1.000−41.000 |  |  |
| $L_{II}$ | 11 | −272.659 | 3.091 | 1.80518 | 25.4 |
|  | 12 | −65.698 | 4.446 |  |  |
|  | 13 | −54.137 | 1.500 | 1.88300 | 40.8 |
|  | 14 | 44.177 | 12.451 |  |  |
|  | 15 | 57.202 | 5.315 | 1.72916 | 54.7 |
|  | 16 | −493.517 |  |  |  |

EXAMPLE 5

$f = 100.12 \quad F_{NO} = 1:2.8 \quad 2\omega = 24.5° \quad F_B = 47.16$

| surface | No. | r | d | $n_d$ | $\nu_d$ |
|---|---|---|---|---|---|
| $L_I$ | 1 | 64.000 | 4.450 | 1.78590 | 44.2 |
|  | 2 | 727.416 | 3.290 |  |  |
|  | 3 | 31.747 | 5.110 | 1.80610 | 40.9 |
|  | 4 | 66.762 | 2.000 |  |  |
|  | 5 | 130.320 | 1.500 | 1.80518 | 25.4 |
|  | 6 | 26.047 | 10.830 |  |  |
|  | 7 | −24.940 | 1.800 | 1.68893 | 31.1 |
|  | 8 | −403.219 | 5.260 | 1.74400 | 44.7 |
|  | 9 | −34.018 | 0.150 |  |  |
|  | 10 | 244.668 | 4.150 | 1.72000 | 42.0 |
|  | 11 | −57.000 | 2.500−48.087 |  |  |
| $L_{II}$ | 12 | −1351.297 | 3.310 | 1.80518 | 25.4 |
|  | 13 | −68.597 | 4.650 |  |  |
|  | 14 | −55.555 | 1.500 | 1.80610 | 40.9 |
|  | 15 | 46.035 | 11.410 |  |  |
|  | 16 | 51.387 | 5.520 | 1.51633 | 64.1 |
|  | 17 | −370.000 |  |  |  |

EXAMPLE 6

$f = 100.48 \quad F_{NO} = 1:2.8 \quad 2\omega = 24.4° \quad F_B = 53.77$

| surface | No. | r | d | $n_d$ | $\nu_d$ |
|---|---|---|---|---|---|
| $L_I$ | 1 | 62.504 | 4.021 | 1.80400 | 46.6 |

-continued

| surface | | No. | r | d | $n_d$ | $v_d$ |
|---|---|---|---|---|---|---|
| | | \multicolumn{5}{l}{f = 100.48  $F_{NO}$ = 1:2.8  2ω = 24.4°  $F_B$ = 53.77} |
| | | 2 | −9446.370 | 0.150 | | |
| | | 3 | 34.697 | 3.307 | 1.83481 | 42.7 |
| | | 4 | 61.586 | 4.849 | | |
| | | 5 | 166.095 | 1.500 | 1.76182 | 26.6 |
| | | 6 | 28.381 | 9.331 | | |
| | | 7 | −27.285 | 1.800 | 1.74077 | 27.8 |
| | | 8 | −161.506 | 4.939 | 1.83400 | 37.2 |
| | | 9 | −35.702 | 0.150 | | |
| | | 10 | 206.844 | 3.700 | 1.80400 | 46.6 |
| | | 11 | −75.061 | 0.806–40.806 | | |
| $L_{II}$ | | 12 | −392.189 | 3.000 | 1.84666 | 23.9 |
| | | 13 | −80.499 | 3.717 | | |
| | | 14 | −79.786 | 1.500 | 1.88300 | 40.8 |
| | | 15 | 44.076 | 13.382 | | |
| | | 16 | 61.272 | 4.799 | 1.71300 | 53.8 |
| | | 17 | −576.557 | | | |

EXAMPLE 7

| surface | | No. | r | d | $n_d$ | $v_d$ |
|---|---|---|---|---|---|---|
| | | \multicolumn{5}{l}{f = 100.45  $F_{NO}$ = 1:2.8  2ω = 24.4°  $F_B$ = 45.64} |
| $L_I$ | | 1 | 63.251 | 4.058 | 1.80400 | 46.6 |
| | | 2 | −605.257 | 0.150 | | |
| | | 3 | 33.672 | 3.600 | 1.83481 | 42.7 |
| | | 4 | 61.511 | 4.154 | | |
| | | 5 | 225.046 | 1.500 | 1.76182 | 26.6 |
| | | 6 | 27.280 | 8.902 | | |
| | | 7 | −27.217 | 1.800 | 1.74077 | 27.8 |
| | | 8 | −189.691 | 4.738 | 1.83400 | 37.2 |
| | | 9 | −36.014 | 0.150 | | |
| | | 10 | 196.875 | 3.700 | 1.80400 | 46.6 |
| | | 11 | −68.648 | 2.000–36.000 | | |
| $L_{II}$ | | 12 | 318.268 | 3.021 | 1.80518 | 25.4 |
| | | 13 | −75.777 | 1.548 | | |
| | | 14 | −74.102 | 1.500 | 1.88300 | 40.8 |
| | | 15 | 38.840 | 19.669 | | |
| | | 16 | 51.202 | 4.853 | 1.56883 | 56.3 |
| | | 17 | 460.483 | | | |

The numerical values that satisfy conditions (1) to (4) in each of Examples 1 to 7 are listed below:

| | \multicolumn{4}{c}{Conditional formula} | | | |
|---|---|---|---|---|
| | (1) $f_I/f$ | (2) $f_{1,2,3}/f$ | (3) $f_{r6}/f$ | (4) $f_{IIn}/f$ |
| Example 1 | 0.678 | 1.679 | −0.320 | −0.583 |
| Example 2 | 0.678 | 1.571 | −0.323 | −0.570 |
| Example 3 | 0.546 | 1.305 | −0.346 | −0.384 |
| Example 4 | 0.632 | 1.372 | −0.271 | −0.500 |
| Example 5 | 0.678 | 1.607 | −0.323 | −0.570 |
| Example 6 | 0.631 | 1.398 | −0.371 | −0.497 |
| Example 7 | 0.582 | 1.231 | −0.357 | −0.438 |

In Examples 1 to 7, the first lens group $L_I$ is displaced by the following amounts when the system focused for an object at infinity is adjusted to life-size shot (magnification of unity): 46.09 in Examples 1, 2 and 5; 30.00 in Example 3; 40.00 in Examples 4 and 6; and 34.00 in Example 7.

The seven examples are described also in the accompanying drawings. The structures of the seven examples as focused for an infinite shooting distance are respectively shown in FIGS. 1, 5, 9, 13, 17, 21 and 25. The corresponding structures as focused for life-size shooting (magnification of unity) are shown in FIGS. 3, 7, 11, 15, 19, 23 and 27.

Figure 2:
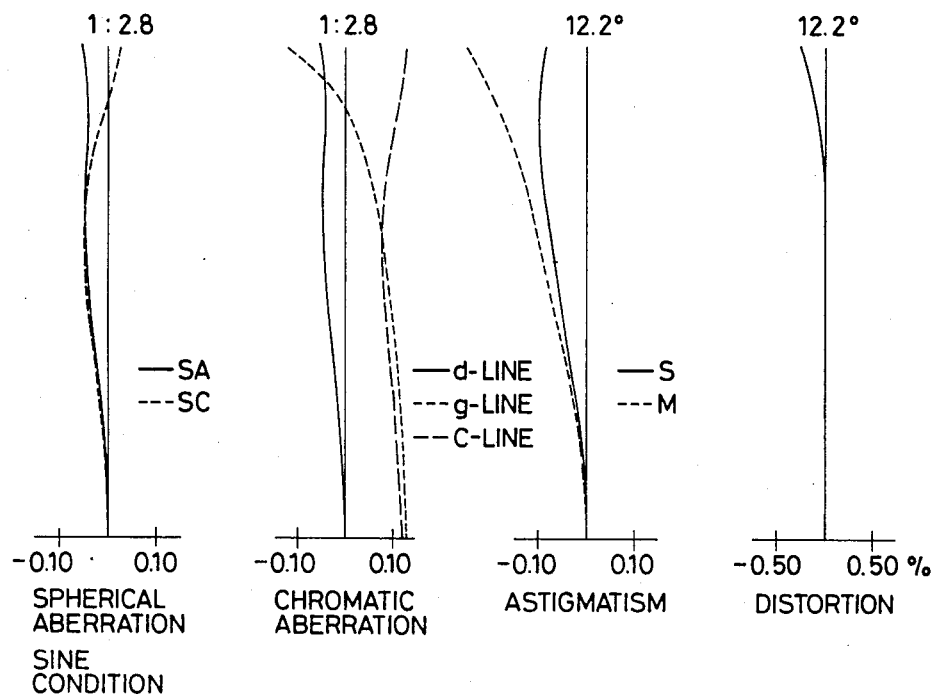
FIGS. 2, 6, 10, 14, 18, 22 and 26 are graphs plotting the aberration curves obtained in Examples 1 to 7 when shooting an object at an infinite distance.
Figure 6:
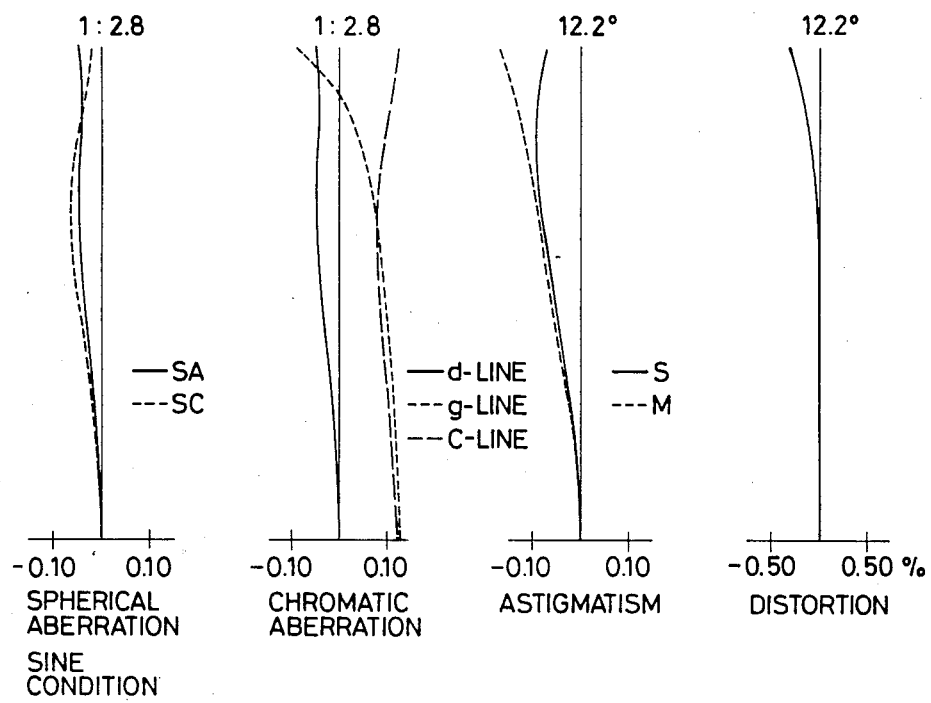
Figure 10:
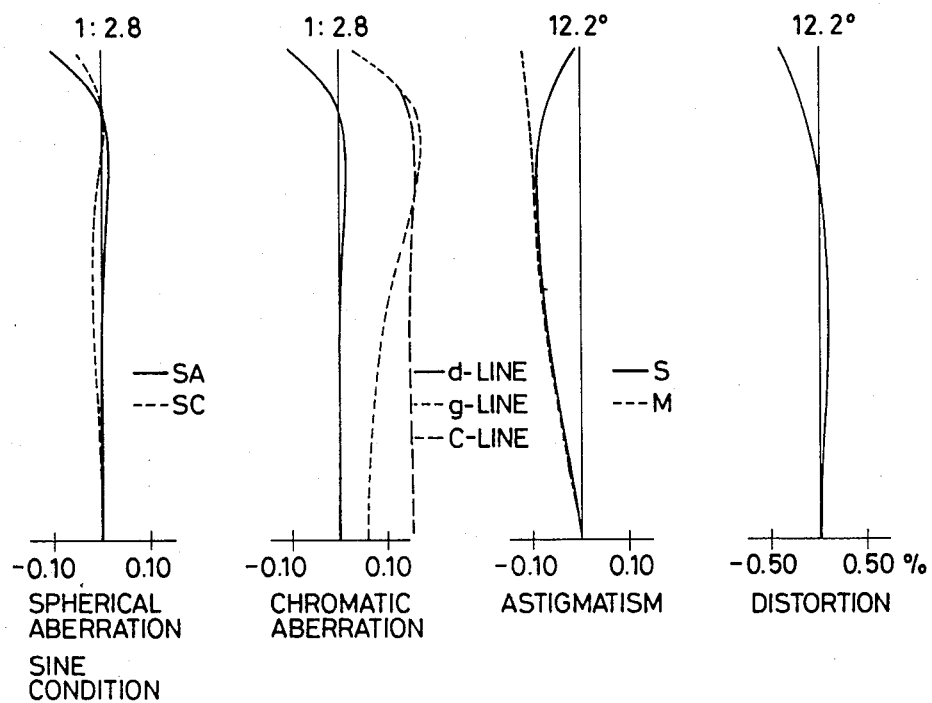
Figure 14:
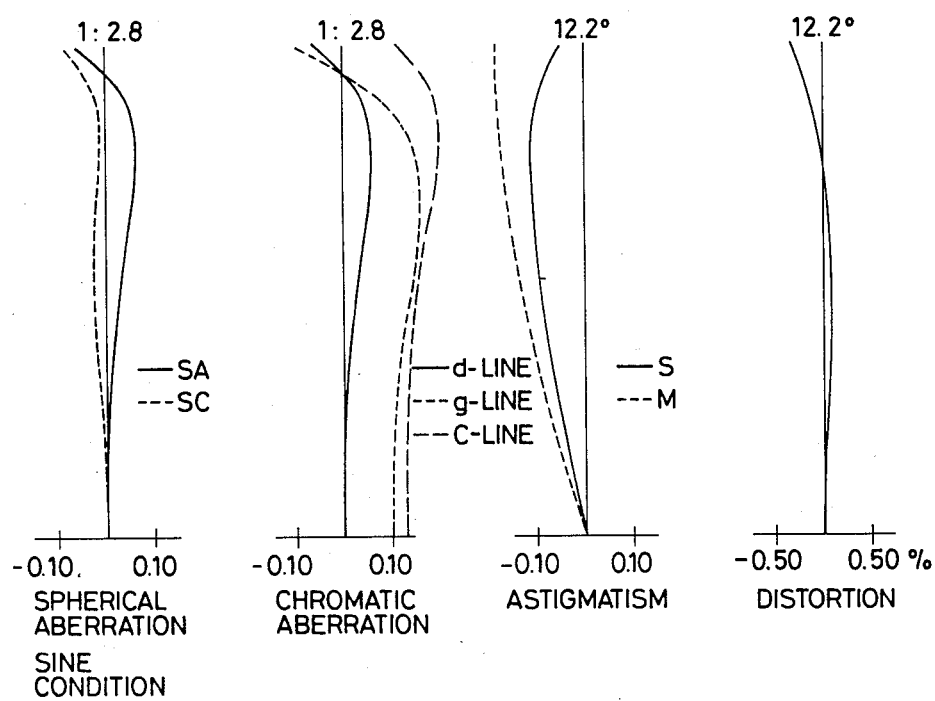
Figure 18:
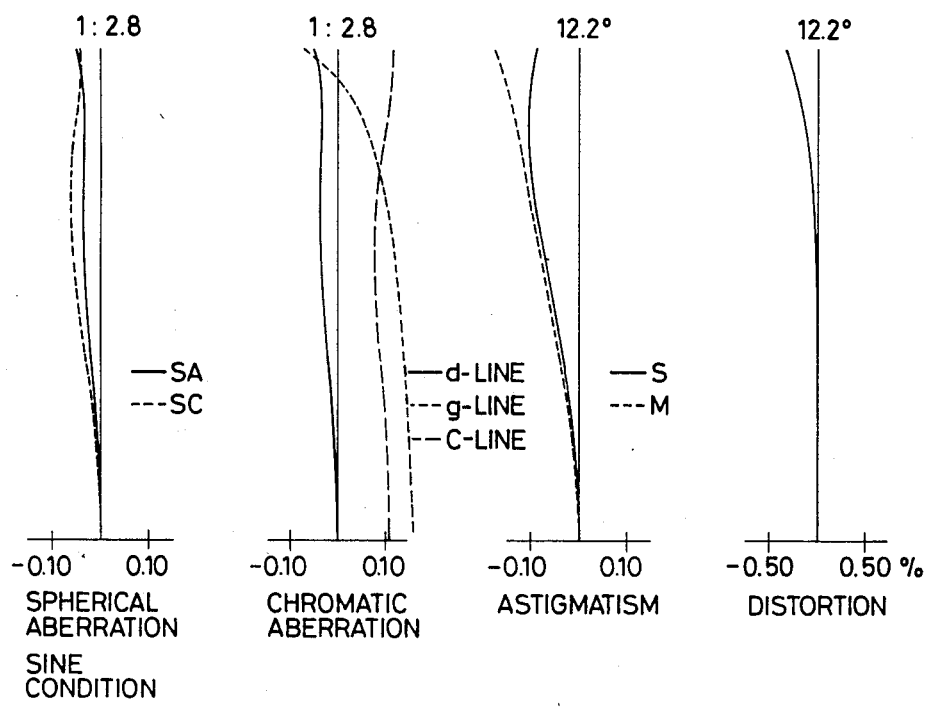
Figure 22:
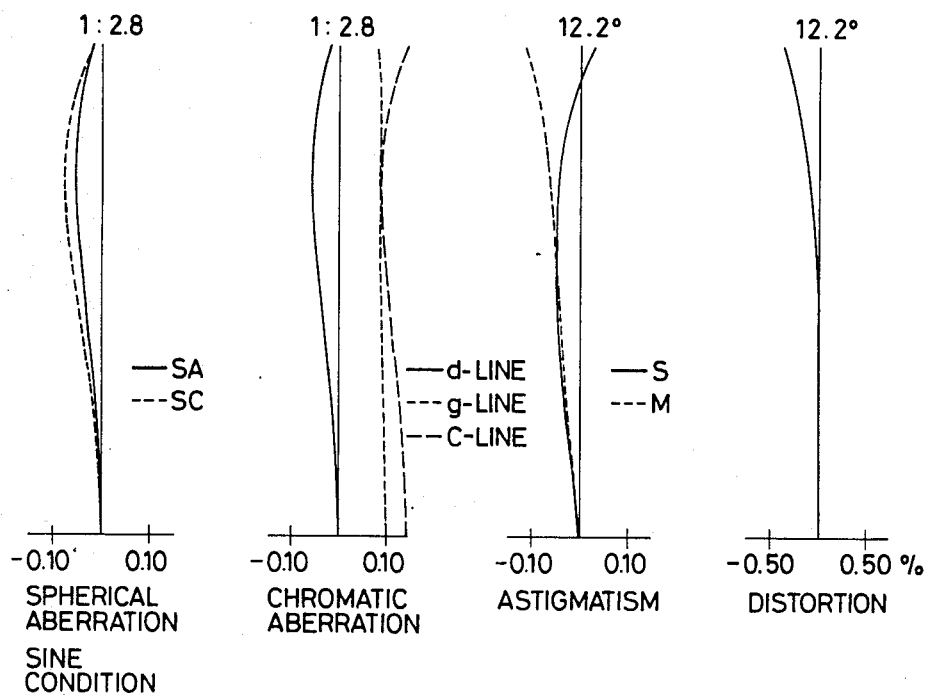
Figure 26:
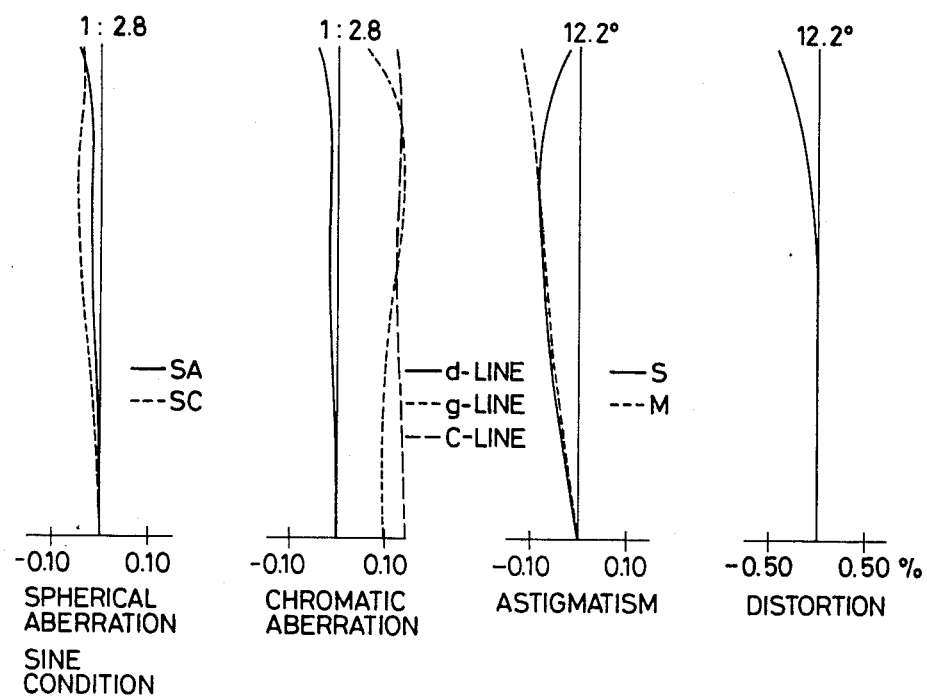

Associated with each of the infinite-focus structures is a drawing for aberration curves at that focus. These curves are contained in FIGS. 2, 6, 10, 14, 18, 22 and 26.

Each drawing contains four graphs. The first graph plots spherical aberration (SA) and sine condition (SC) as a function of aperture. The second graph plots chromatic aberration as a function of aperture for the d-line, g-line and C-line. The third graph plots astigmatism as a function of viewing angle for the sagittal (S) direction and the meridional (M) direction. The fourth graph plots distortion as a function of viewing angle.

Figure 4:
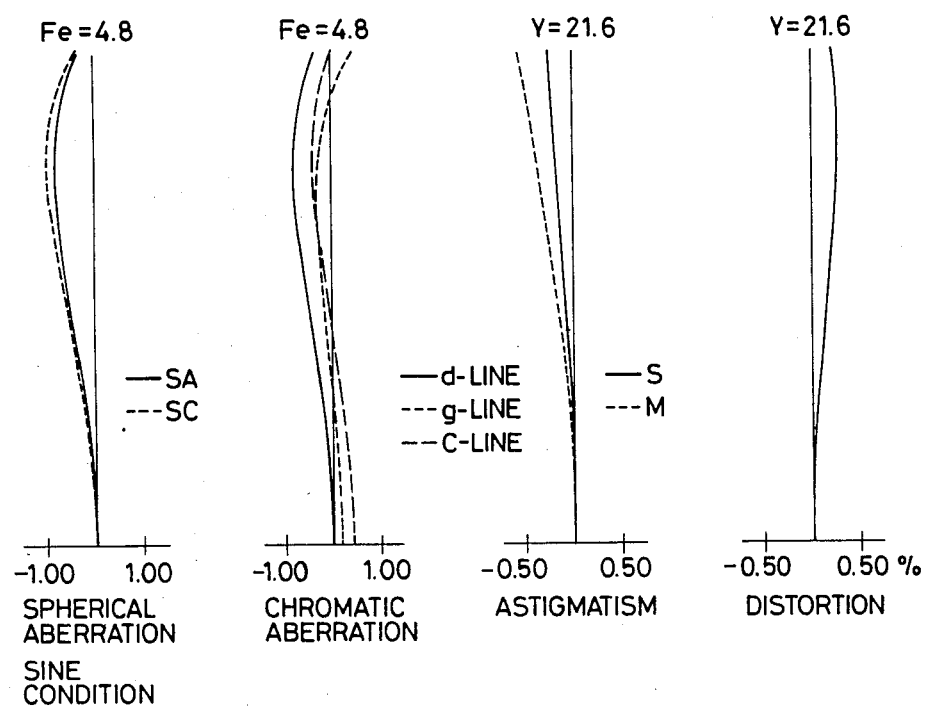
FIGS. 4, 8, 12, 16, 20, 24 and 28 are graphs plotting the aberration curves obtained in Examples 1 to 7 when imaging at a magnification of unity.
Figure 8:
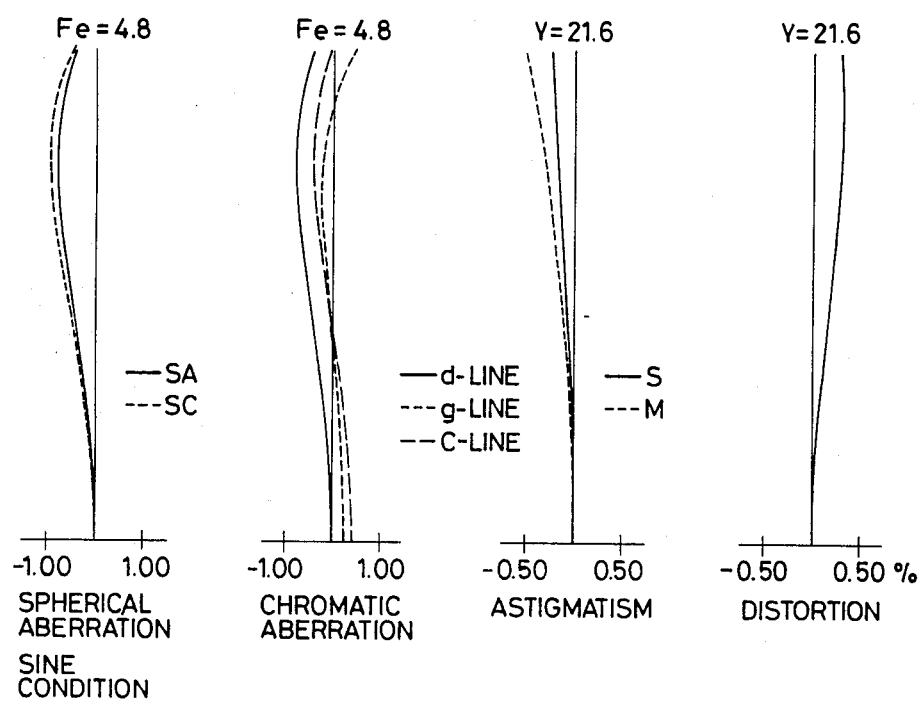
Figure 12:
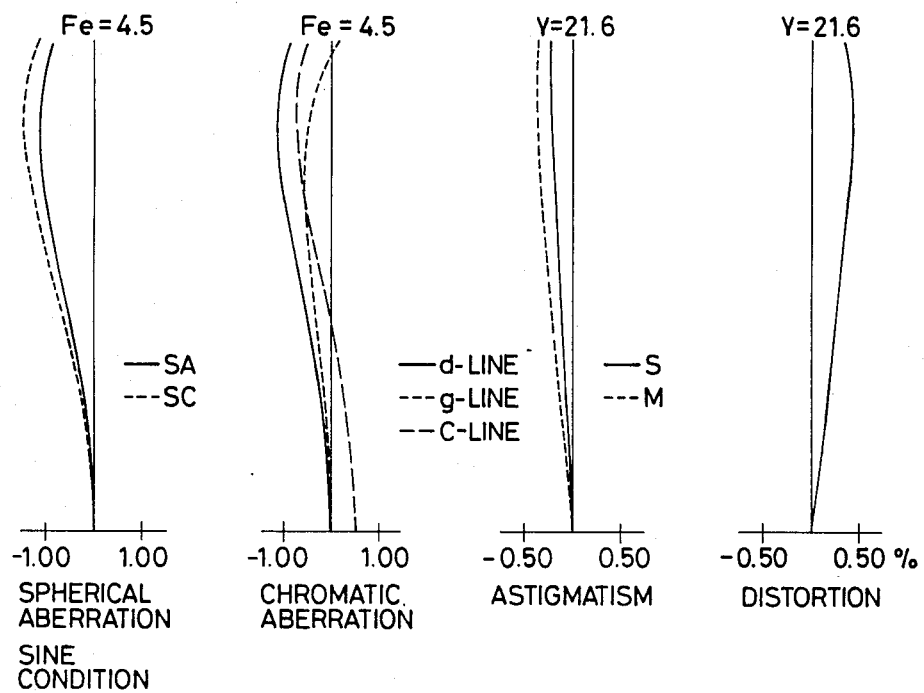
Figure 16:
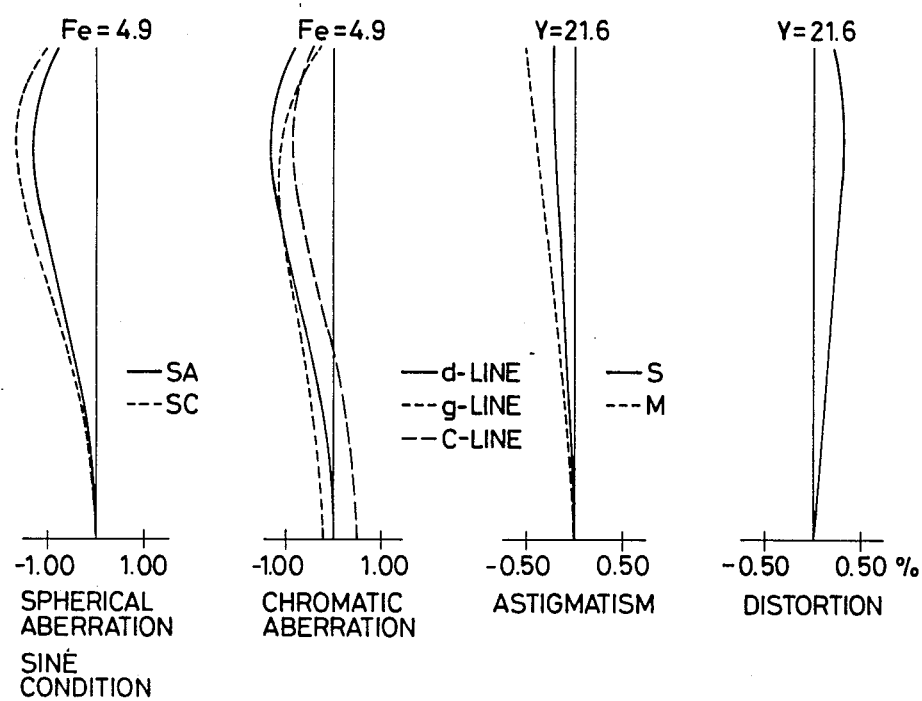
Figure 20:
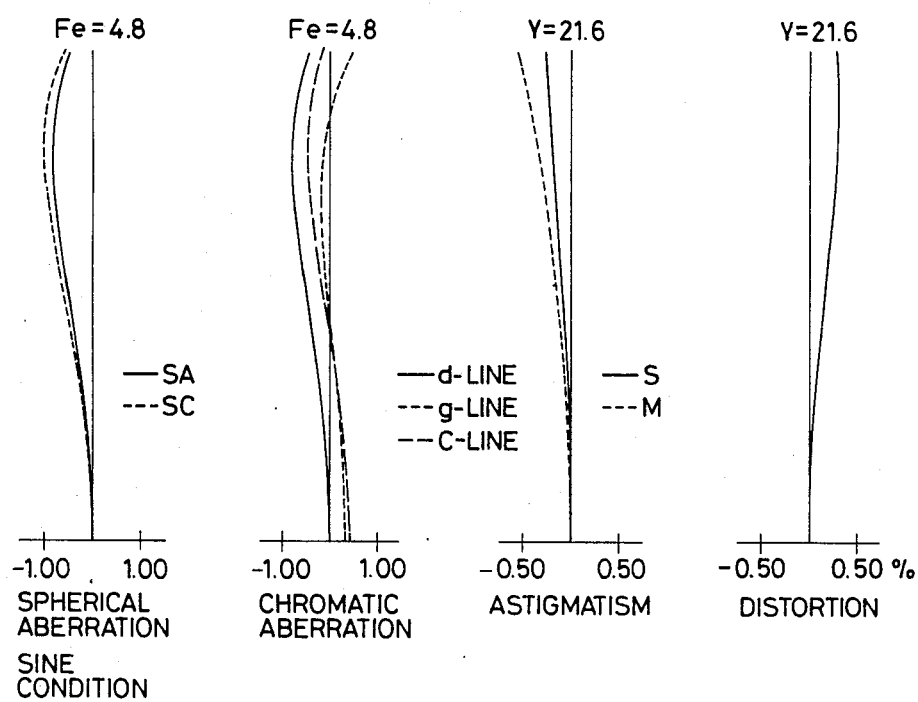
Figure 24:
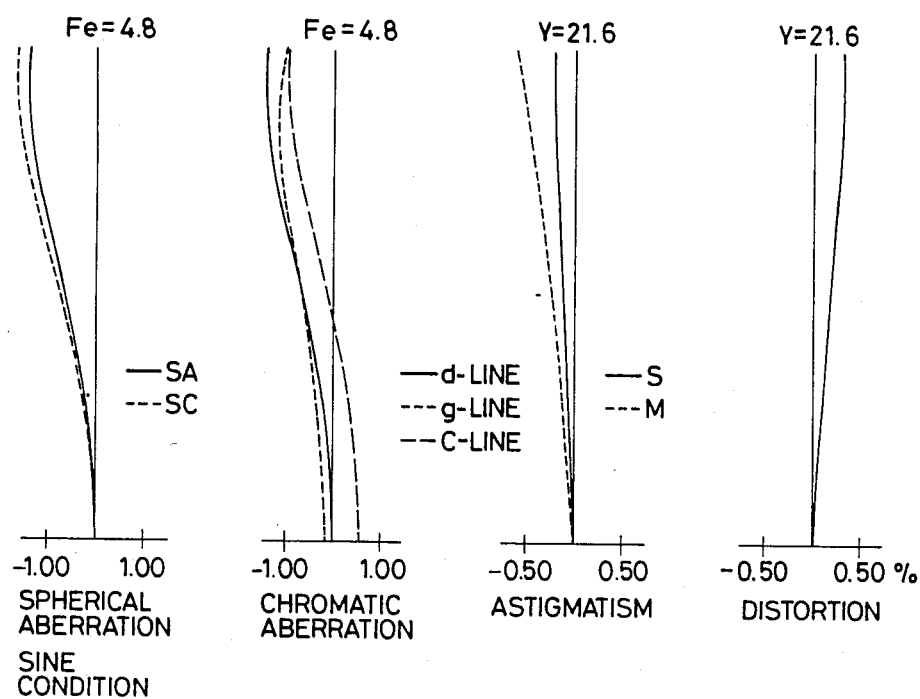
Figure 28:
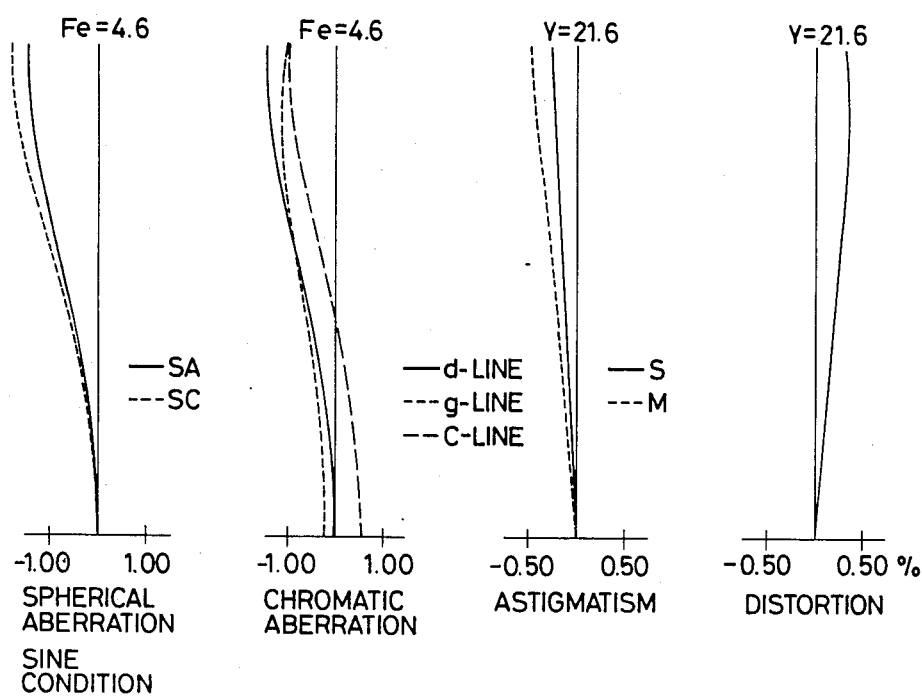

There are also provided aberration curves for the seven examples as adjusted for life-size shooting. These curves are displayed in FIGS. 4, 8, 12, 16, 20, 24 and 28. The format of these unity-magnification curves is the same as for the infinite-focus curves except that the aperture $F_e$ is the appropriate aperture at unity focus and that image height Y is substituted for viewing angle.

What is claimed is:

1. A lens system, comprising, in order from an object side, a first lens group having a positive refractive power and a second lens group having a negative refractive power, said lens system effecting focusing from an infinite distance to a closer distance by increasing an aerial distance between said first lens group and said second lens group, said first lens group consisting of first through fifth units, said first unit being a first lens element which is a positive lens, said second unit being a lens element which is a positive meniscus lens, said third unit being a lens element which is a negative lens, said fourth unit having a slightly negative value of refractive power and comprising at least one lens element, said fifth unit being a positive lens element, said second lens group consisting of sixth through eighth units, said sixth unit being a positive lens element, said seventh unit being a negative lens element, and said eighth unit being a positive lens element, said lens system satisfying the following conditions (1) to (4):

$$0.5 < f_I/f < 0.7 \quad (1)$$

$$1.2 < f_{1,2,3}/f < 1.7 \quad (2)$$

$$-0.4 < f_{r6}/f < -0.2 \quad (3)$$

$$-0.6 < f_{IIn}/f < -0.3 \quad (4)$$

where f is a focal length of said lens system focused at infinity, $f_I$ is a focal length of said first lens group, $f_{1,2,3}$ is a composite focal length of said first, second and third units, $f_{r6} = r_6/(1-n_3)$, $r_6$ is a radius of curvature of the surface of the lens of said third unit facing away from said object side, $n_3$ is a refractive index at a given wavelength of said lens of said third unit, $f_{IIn} = r_{IIn}/(1-n_{IIn})$, $r_{IIn}$ is a radius of curvature of the surface of the negative lens element of said seventh unit, and $n_{IIn}$ is a refractive index at said given wavelength of said negative lens element of said seventh unit.

2. A lens system as recited in claim 1, wherein said fourth unit consists of a single lens element.

3. A lens system as recited in claim 1, wherein said fourth unit consists of a negative lens element and a positive lens element cemented together.

4. A lens system as recited in claim 1, wherein $r_i$ is the radius of curvature of the i-th lens surface from the object side, $d_i$ is the distance between the i-th and (i+1)-th lens surfaces, and $n_i$ and $v_i$ are the refractive index and the Abbe number at the d-line of the lens element having lens surface $d_i$ on its object side, said lens elements satisfying the following table:

| i | $r_i$ | $d_i$ | $n_i$ | $\nu_d$ |
|---|---|---|---|---|
| 1 | 64.764 | 4.300 | 1.78590 | 44.2 |
| 2 | 473.491 | 4.773 | | |
| 3 | 31.180 | 4.800 | 1.80610 | 40.9 |
| 4 | 75.635 | 1.800 | | |
| 5 | 152.788 | 1.500 | 1.80518 | 25.4 |
| 6 | 25.817 | 11.674 | | |
| 7 | −24.386 | 1.800 | 1.74000 | 28.3 |
| 8 | −83.740 | 4.500 | 1.80610 | 40.9 |
| 9 | −32.411 | 0.150 | | |
| 10 | 250.715 | 4.602 | 1.72000 | 42.0 |
| 11 | −54.589 | 2.500−48.587 | | |
| 12 | −906.318 | 3.701 | 1.80518 | 25.4 |
| 13 | −67.189 | 5.356 | | |
| 14 | −51.897 | 1.500 | 1.80610 | 40.9 |
| 15 | 47.120 | 10.398 | | |
| 16 | 50.044 | 5.428 | 1.51633 | 64.1 |
| 17 | −466.238. | | | |

5. A lens system as recited in claim 1, wherein $r_i$ is the radius of curvature of the i-th lens surface from the object side, $d_i$ is the distance between the i-th and (i+1)-th lens surfaces, and $n_i$ and $\nu_i$ are the refractive index and the Abbe number at the d-line of the lens element having lens surface $d_i$ on its object side, said lens elements satisfying the following table:

| i | $r_i$ | $d_i$ | $n_i$ | $\nu_d$ |
|---|---|---|---|---|
| 1 | 64.000 | 4.500 | 1.78590 | 44.2 |
| 2 | 750.150 | 3.050 | | |
| 3 | 31.747 | 5.410 | 1.80610 | 40.9 |
| 4 | 66.120 | 1.900 | | |
| 5 | 128.547 | 1.500 | 1.80518 | 25.4 |
| 6 | 25.817 | 11.674 | | |
| 7 | −25.160 | 1.800 | 1.74000 | 28.3 |
| 8 | −120.000 | 5.000 | 1.80610 | 40.9 |
| 9 | −34.000 | 0.150 | | |
| 10 | 244.668 | 4.440 | 1.72000 | 42.0 |
| 11 | −57.000 | 2.500−48.587 | | |
| 12 | −1351.297 | 3.340 | 1.80518 | 25.4 |
| 13 | −68.597 | 4.640 | | |
| 14 | −55.555 | 1.500 | 1.80610 | 40.9 |
| 15 | 46.035 | 11.590 | | |
| 16 | 51.387 | 5.510 | 1.51633 | 64.1 |
| 17 | −370.000. | | | |

6. A lens system as recited in claim 1, wherein $r_i$ is the radius of curvature of the i-th lens surface from the object side, $d_i$ is the distance between the i-th and (i+1)-th lens surfaces, and $n_i$ and $\nu_i$ are the refractive index and the Abbe number at the d-line of the lens element having lens surface $d_i$ on its object side, said lens elements satisfying the following table:

| i | $r_i$ | $d_i$ | $n_i$ | $\nu_d$ |
|---|---|---|---|---|
| 1 | 61.428 | 4.003 | 1.80400 | 46.6 |
| 2 | −828.516 | 0.150 | | |
| 3 | 34.419 | 4.000 | 1.83481 | 42.7 |
| 4 | 84.536 | 4.046 | | |
| 5 | 1726.841 | 1.500 | 1.78472 | 25.7 |
| 6 | 27.243 | 7.784 | | |
| 7 | −27.071 | 1.800 | 1.72825 | 28.5 |
| 8 | −92.450 | 3.632 | 1.83400 | 37.2 |
| 9 | −34.908 | 0.150 | | |
| 10 | 149.627 | 3.777 | 1.77250 | 49.7 |
| 11 | −60.691 | 2.000−32.000 | | |
| 12 | 124.956 | 3.182 | 1.80518 | 25.4 |
| 13 | −65.902 | 0.485 | | |
| 14 | −66.592 | 1.500 | 1.88300 | 40.8 |
| 15 | 34.039 | 23.902 | | |
| 16 | 42.722 | 3.984 | 1.51633 | 64.1 |
| 17 | 106.221. | | | |

7. A lens system as recited in claim 1, wherein $r_i$ is the radius of curvature of the i-th lens surface from the object side, $d_i$ is the distance between the i-th and (i+1)-th lens surfaces, and $n_i$ and $\nu_i$ are the refractive index and the Abbe number at the d-line of the lens element having lens surface $d_i$ on its object side, said lens elements satisfying the following table:

| i | $r_i$ | $d_i$ | $n_i$ | $\nu_d$ |
|---|---|---|---|---|
| 1 | 58.324 | 4.286 | 1.80400 | 46.6 |
| 2 | −3268.671 | 0.126 | | |
| 3 | 27.176 | 5.044 | 1.80400 | 46.6 |
| 4 | 46.785 | 3.038 | | |
| 5 | 96.990 | 1.500 | 1.80518 | 25.4 |
| 6 | 21.790 | 12.883 | | |
| 7 | −22.910 | 3.000 | 1.80400 | 46.6 |
| 8 | −29.198 | 0.200 | | |
| 9 | 164.912 | 4.609 | 1.61272 | 58.8 |
| 10 | −38.915 | 1.000−41.000 | | |
| 11 | −272.659 | 3.091 | 1.80518 | 25.4 |
| 12 | −65.698 | 4.446 | | |
| 13 | −54.137 | 1.500 | 1.88300 | 40.8 |
| 14 | 44.177 | 12.451 | | |
| 15 | 57.202 | 5.315 | 1.72916 | 54.7 |
| 16 | −493.517. | | | |

8. A lens system as recited in claim 1, wherein $r_i$ is the radius of curvature of the i-th lens surface from the object side, $d_i$ is the distance between the i-th and (i+1)-th lens surfaces, and $n_i$ and $\nu_i$ are the refractive index and the Abbe number at the d-line of the lens element having lens surface $d_i$ on its object side, said lens elements satisfying the following table:

| i | $r_i$ | $d_i$ | $n_i$ | $\nu_d$ |
|---|---|---|---|---|
| 1 | 64.000 | 4.450 | 1.78590 | 44.2 |
| 2 | 727.416 | 3.290 | | |
| 3 | 31.747 | 5.110 | 1.80610 | 40.9 |
| 4 | 66.762 | 2.000 | | |
| 5 | 130.320 | 1.500 | 1.80518 | 25.4 |
| 6 | 26.047 | 10.830 | | |
| 7 | −24.940 | 1.800 | 1.68893 | 31.1 |
| 8 | −403.219 | 5.260 | 1.74400 | 44.7 |
| 9 | −34.018 | 0.150 | | |
| 10 | 244.668 | 4.150 | 1.72000 | 42.0 |
| 11 | −57.000 | 2.500−48.087 | | |
| 12 | −1351.297 | 3.310 | 1.80518 | 25.4 |
| 13 | −68.597 | 4.650 | | |
| 14 | −55.555 | 1.500 | 1.80610 | 40.9 |
| 15 | 46.035 | 11.410 | | |
| 16 | 51.387 | 5.520 | 1.51633 | 64.1 |
| 17 | −370.000. | | | |

9. A lens system as recited in claim 1, wherein $r_i$ is the radius of curvature of the i-th lens surface from the object side, $d_i$ is the distance between the i-th and (i+1)-th lens surfaces, and $n_i$ and $\nu_i$ are the refractive index and the Abbe number at the d-line of the lens element having lens surface $d_i$ on its object side, said lens elements satisfying the following table:

| i | $r_i$ | $d_i$ | $n_i$ | $\nu_d$ |
|---|---|---|---|---|
| 1 | 62.504 | 4.021 | 1.80400 | 46.6 |
| 2 | −9446.370 | 0.150 | | |
| 3 | 34.697 | 3.307 | 1.83481 | 42.7 |
| 4 | 61.586 | 4.849 | | |
| 5 | 166.095 | 1.500 | 1.76182 | 26.6 |
| 6 | 28.381 | 9.331 | | |
| 7 | −27.285 | 1.800 | 1.74077 | 27.8 |
| 8 | −161.506 | 4.939 | 1.83400 | 37.2 |
| 9 | −35.702 | 0.150 | | |
| 10 | 206.844 | 3.700 | 1.80400 | 46.6 |

-continued

| i | $r_i$ | $d_i$ | $n_i$ | $\nu_d$ |
|---|---|---|---|---|
| 11 | −75.061 | 0.806–40.806 | | |
| 12 | −392.189 | 3.000 | 1.84666 | 23.9 |
| 13 | −80.499 | 3.717 | | |
| 14 | −79.786 | 1.500 | 1.88300 | 40.8 |
| 15 | 44.076 | 13.382 | | |
| 16 | 61.272 | 4.799 | 1.71300 | 53.8 |
| 17 | −576.557. | | | |

10. A lens system as recited in claim 1, wherein $r_i$ is the radius of curvature of the i-th lens surface from the object side, $d_i$ is the distance between the i-th and (i+1)-th lens surfaces, and $n_i$ and $\nu_i$ are the refractive index and the Abbe number at the d-line of the lens element having lens surface $d_i$ on its object side, said lens elements satisfying the following table:

| i | $r_i$ | $d_i$ | $n_i$ | $\nu_d$ |
|---|---|---|---|---|
| 1 | 63.251 | 4.058 | 1.80400 | 46.6 |
| 2 | −605.257 | 0.150 | | |
| 3 | 33.672 | 3.600 | 1.83481 | 42.7 |
| 4 | 61.511 | 4.154 | | |
| 5 | 225.046 | 1.500 | 1.76182 | 26.6 |
| 6 | 27.280 | 8.902 | | |
| 7 | −27.217 | 1.800 | 1.74077 | 27.8 |
| 8 | −189.691 | 4.738 | 1.83400 | 37.2 |
| 9 | −36.014 | 0.150 | | |
| 10 | 196.875 | 3.700 | 1.80400 | 46.6 |
| 11 | −68.648 | 2.000–36.000 | | |
| 12 | 318.268 | 3.021 | 1.80518 | 25.4 |
| 13 | −75.777 | 1.548 | | |
| 14 | −74.102 | 1.500 | 1.88300 | 40.8 |
| 15 | 38.840 | 19.669 | | |
| 16 | 51.202 | 4.853 | 1.56883 | 56.3 |
| 17 | 460.483. | | | |

* * * * *